(12) United States Patent
Kondo (10) Patent No.: US 8,423,293 B2
(45) Date of Patent: Apr. 16, 2013

(54) DISPLAY CONTROL DEVICE, DISPLAY CONTROL METHOD AND CONTROL PROGRAM

(75) Inventor: Katsuyuki Kondo, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 447 days.

(21) Appl. No.: 12/670,332

(22) PCT Filed: Jul. 18, 2008

(86) PCT No.: PCT/JP2008/062992
§ 371 (c)(1),
(2), (4) Date: Apr. 19, 2010

(87) PCT Pub. No.: WO2009/014080
PCT Pub. Date: Jan. 29, 2009

(65) Prior Publication Data
US 2010/0223004 A1      Sep. 2, 2010

(30) Foreign Application Priority Data
Jul. 23, 2007   (JP) .................................. 2007-190549

(51) Int. Cl.
*G09G 5/377* (2006.01)
(52) U.S. Cl.
USPC ............ 701/436; 701/459; 345/679; 715/850
(58) Field of Classification Search .................. 701/436, 701/454, 455, 459, 523; 342/176, 177, 179; 345/4, 6, 9, 419, 1.1, 161, 653, 664, 679; 434/29; 715/792, 797, 850, 810, 811, 829, 715/830, 838, 851; 707/733, 743, 805, 808; 340/995.14, 995.15, 995.16, 995.26
See application file for complete search history.

(56) References Cited

U.S. PATENT DOCUMENTS
6,577,330 B1 *  6/2003  Tsuda et al. .................. 715/782
2001/0040505 A1 * 11/2001  Ishida et al. .................. 340/435
(Continued)

FOREIGN PATENT DOCUMENTS
JP      06-266330      9/1994
JP      10-320167      12/1998
(Continued)

OTHER PUBLICATIONS

English translation of International Preliminary Report on Patentability and Written Opinion of the International Searching Authority issued in International Patent Application No. PCT/JP2008/062992, mailed Feb. 18, 2010.

*Primary Examiner* — Mark Beauchaine
(74) *Attorney, Agent, or Firm* — McDermott Will & Emery LLP (57) ABSTRACT

A user can visually and instinctively understand an operation to be executed, and a corresponding operation screen or input screen is easily displayed and operated. Plural flat display objects each having a predetermined displace face having each kind of information displayed in a virtual three-dimensional space are arranged in a predetermined area every category and classified into one main display object 51A and sub display objects 51B other than the display object 51A, the main display object 51A is rotated so that a display face thereof is perpendicular to or intersects to the overhead-view direction, and moved in the virtual three-dimensional space so as to be located in the overhead-view direction or in the neighborhood of the overhead-view direction while following variation of the overhead-view direction, and displayed on the display device, and the sub display objects 51B are controlled to be rotated in the virtual three-dimensional space so that display faces thereof are perpendicular to or intersect to the overhead view direction and displayed on the display screen of the display device 16.

17 Claims, 9 Drawing Sheets

U.S. PATENT DOCUMENTS

| | | | |
|---|---|---|---|
| 2004/0100479 A1* | 5/2004 | Nakano et al. | 345/700 |
| 2006/0167629 A1* | 7/2006 | Ishii et al. | 701/211 |

FOREIGN PATENT DOCUMENTS

| | | |
|---|---|---|
| JP | 11-039132 | 2/1999 |
| JP | 2003-330586 | 11/2003 |
| JP | 2005-018796 | 1/2005 |
| JP | 2005-096596 | 4/2005 |
| JP | 2007-140817 | 6/2007 |

* cited by examiner

FIG. 9

DISPLAY CONTROL DEVICE, DISPLAY CONTROL METHOD AND CONTROL PROGRAM

RELATED APPLICATIONS

This application is the U.S. National Phase under 35 U.S.C. §371 of International Application No. PCT/JP2008/062992, filed on Jul. 18, 2008, which in turn claims the benefit of Japanese Application No. 2007-190549, filed on Jul. 23, 2007, the disclosures of which Applications are incorporated by reference herein.

TECHNICAL FIELD

The present invention relates to a display control device, a display control method and a control program, and particularly to a technique of enabling a user to instinctively understand various kinds of operations required to implement desired functions even when a display screen size of a display device such as in-vehicle mount equipment or the like.

BACKGROUND ART

In connection with development of recent digital technologies, multifunctional in-vehicle equipment having various functions has multiplied even with respect to in-vehicle mount equipment such as car navigation devices, car audio devices, etc.

Therefore, when a large variety of functions are used, these functions are classified every category, it is a general method to make a user select his/her desired function by using a menu screen having a hierarchical structure such as a tree structure or the like (for example, see JP-A-2005-96596).

DISCLOSURE OF THE INVENTION

Problem to be Solved by the Invention

However, the menu screen of the hierarchical structure used in the in-vehicle equipment as described above does not perform any list display. Therefore, it has been difficult to instinctively understand where a display screen to implement a desired function exists, and thus the user cannot reach an operation screen or input screen even when the user understand what he/she wants to do. Accordingly, there occurs such a case that the user cannot attain his/her object. Specifically, when the operation screen or input screen corresponding to a user's desired function is located at the lower layer side (particularly at the lowermost layer side) of the hierarchical structure, and thus the user cannot display the corresponding screen if he/she is not familiar with the operation.

Therefore, an object of the present invention is to provide a display control device, a display control method and a control program that enable a user to visually and instinctively understand an operation to be executed in order to implement user's desired function, and can easily display the corresponding operation screen or input screen so that the user can perform an operation.

Means of Solving the Problem

In order to attain the above object, a display control device according to the present invention for arranging flat type plural display objects each having a desired display face having each kind of information displayed thereon in a virtual three-dimensional space, and making an external display device display an image in which the display objects are viewed in an overhead-view style from a view point position input from an external on the basis of three-dimensional coordinate position data corresponding to the view point position, overhead-view direction data corresponding to an overhead-view direction from the view point position and zoom data (for example, display field angle data corresponding to a display field angle and display magnification data corresponding to a display magnification) is characterized in that the plural display objects belong to any category of plural predetermined categories and are arranged in a predetermined space area every category and classified into one main display object and sub display objects other than the main display object, the main display object is rotated so that a display face thereof is perpendicular to or intersects to the overhead-view direction, and moved in the virtual three-dimensional space so as to be located in the overhead-view direction or in the neighborhood of the overhead-view direction while following variation of the overhead-view direction, and displayed on a display screen of the display device, and the sub display objects are controlled to be rotated in the virtual three-dimensional space so that display faces thereof are perpendicular to or intersect to the overhead view direction and displayed on the display screen of the display device.

According to this construction, the main display object is rotated so that the display face thereof is perpendicular to or intersects to the overhead-view direction, and moved in the virtual three-dimensional space so as to be located in the overhead-view direction or in the neighborhood of the overhead-view direction while following variation of the overhead-view direction, and displayed on the display screen of the display device, and the sub display objects are controlled to be rotated in the virtual three-dimensional space so that the display faces thereof are perpendicular to or intersect to the overhead view and displayed on the display screen of the display device.

Each display object belongs to any category of the plural predetermined categories, and arranged in a predetermined space area every category. Therefore, the overall construction can be easily grasped, and a target display object, and thus an operation to be executed can be visually and instinctively understood by a user, so that the corresponding operation screen or input screen can be easily displayed.

In this case, a predetermined axis may be virtually arranged in the virtual three-dimensional space, and the three-dimensional space may be divided into the plural space areas in an extension direction of the axis. Furthermore, the display objects may be arranged circumferentially with respect to a circle vertical to the axis around the axis in a space area allocated to a category to which the display objects concerned belong.

Furthermore, a ring-shaped category identification object along the circumference may be displayed in the neighborhood of the corresponding display object every category.

Furthermore, in a case where the main display object is displayed on the overall display screen on the basis of the three-dimensional coordinate position data and the zoom data, when a sub display object is located in front of the main display object, an image in which the image of the sub display object is superposed on the image of the main display object may be displayed as an overhead-viewed image.

The categories may contain an identification information category for displaying information to specify individual users, a time variation information category for displaying information varying with time, a search information category for displaying information necessary for search, and a setting information category for displaying various kinds of setting information.

The display device is a display device used for an in-vehicle mount information processing device, and the display object belonging to the identification information category may display information necessary to specify a driver of a vehicle in which the in-vehicle mount information processing device is mounted.

The display device is a display device used for an in-vehicle mount information processing device, and the display object belonging to the search information category may display information necessary to perform route guidance or searching a source for a reproduction target in a vehicle in which the in-vehicle mount navigation device is mounted.

Furthermore, the display device is a display device used for an in-vehicle mount navigation device as an in-vehicle mount information processing device, and the display object belonging to the time variation information category may display information necessary to perform route guidance during running in a vehicle having the in-vehicle mount navigation device mounted therein.

Furthermore, the main display object may be a map screen for route guidance.

The display control device may be connected to an input device that can input the three-dimensional coordinate position data, the display field angle data and the display magnification by a user's operation.

Furthermore, a display control method for arranging flat type plural display objects each having a desired display face having each kind of information displayed thereon in a virtual three-dimensional space, and making an external display device display an image in which the display objects are viewed in an overhead-view style from a view point position input from an external on the basis of three-dimensional coordinate position data corresponding to the view point position, overhead-view direction data corresponding to an overhead-view direction from the view point position and zoom data (for example, display field angle data corresponding to a display field angle and display magnification data corresponding to a display magnification), the plural display objects belonging to any category of plural predetermined categories and being arranged in a predetermined space area every category and classified into one main display object and sub display objects other than the main display object, comprises: a step of rotating the main display object so that a display face thereof is perpendicular to or intersects to the overhead-view direction and moving in the virtual three-dimensional space so as to be located in the overhead-view direction or in the neighborhood of the overhead-view direction while following variation of the overhead-view direction; a step of rotating the sub display objects in the virtual three-dimensional space so that display faces of the sub display objects are perpendicular to or intersect to the overhead view direction; and a step of displaying the overhead-viewed image on the display screen of the display device.

There is provided a control program causing a computer to execute a control process on a display control device for arranging flat type plural display objects each having a desired display face having each kind of information displayed thereon in a virtual three-dimensional space, and making an external display device display an image in which the display objects are viewed in an overhead-view style from a view point position input from an external on the basis of three-dimensional coordinate position data corresponding to the view point position, overhead-view direction data corresponding to an overhead-view direction from the view point position and zoom data (for example, display field angle data corresponding to a display field angle and display magnification data corresponding to a display magnification), the plural display objects belonging to any category of plural predetermined categories and being arranged in a predetermined space area every category and classified into one main display object and sub display objects other than the main display object, the control process comprising: rotating the main display object so that a display face thereof is perpendicular to or intersects to the overhead-view direction and moving in the virtual three-dimensional space so as to be located in the overhead-view direction or in the neighborhood of the overhead-view direction while following variation of the overhead-view direction; rotating the sub display objects in the virtual three-dimensional space so that display faces of the sub display objects are perpendicular to or intersect to the overhead view direction; and displaying the overhead-viewed image on the display screen of the display device.

Effect of the Invention

According to the present invention, a user can visually and instinctively understand an operation to be executed, the corresponding operation screen or input screen can be easily displayed, and the operation of corresponding equipment can be easily performed.

DESCRIPTION OF REFERENCE NUMERALS 10 car navigation device
11 GPS unit
12 gyro unit
13 Vehicle speed detector
14 FM receiver
14A FM antenna
15 beacon receiver
15a beacon antenna
16 display unit
17 instruction input unit
18 user interface unit
19 alarm unit
20 controller 21 information storage unit
22 external recording device controller
23 communication controller
30 ROM
31 DRAM
32 SRAM
33 VRAM
41 joystick input device
42 base unit
43 arm unit
44 zoom instruction input unit
50 virtual three-dimensional space
51 display face
51 display object
51A main display object
51B sub display object
51AS display face
51BS display face
52 video camera
53 axis
53 virtual three-dimensional space
54 ring
P view point position

BEST MODES FOR CARRYING THE INVENTION

Next, a preferred embodiment of the present invention will be described with reference to the drawings.

Figure 1:
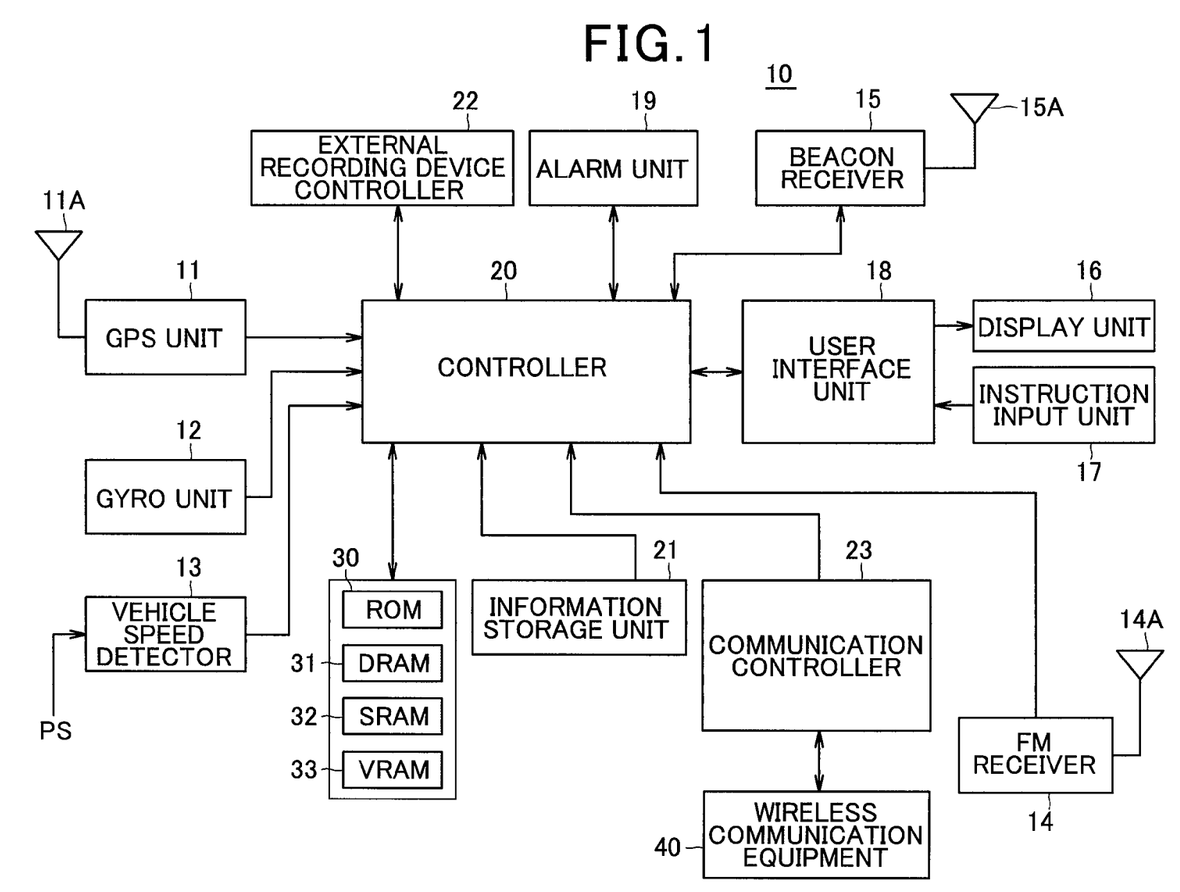
FIG. 1 is a block diagram showing the construction of a car navigation device as an in-vehicle mount type information processing device having a display control device according to an embodiment.

FIG. 1 is a block diagram showing the construction of a car navigation device as an in-vehicle information processing device having a display control device according to an embodiment.

The car navigation device 10 is mounted in a vehicle, and it is a device having a navigation function for executing a rouge guidance for this vehicle and a facilities searching function.

The car navigation device 10 is roughly equipped with a GPS unit 11, a gyro unit 12, a vehicle speed detector 13, an FM receiver 14, a beacon receiver 15, a display unit 16, an instruction input unit 17, a user interface unit 18, an alarm unit 19, a controller 20, an information storage unit 21, an external recording device controller 22 and a communication controller 23.

The GPS unit 11 receives a GPS electric wave from a GPS satellite through an GPS antenna, and obtains a position coordinate representing a current position and a travel direction from a GPS signal superposed on the GPS electric wave by calculation. Furthermore, the GPS unit 11 obtains date-and-hour information (year, month, day, hour, minute, etc.) of the present place of the vehicle from date-and-hour information contained in the GPS signal and the time difference of the present place of the vehicle by calculation, and outputs these information to the controller 20.

The gyro unit 12 detects a relative direction (=travel direction) of the vehicle by the gyro sensor, and outputs it to the controller 20. The vehicle speed detector 13 calculates the speed of the vehicle on the basis of a vehicle speed pulse PS of the vehicle, and outputs it to the controller 20.

The FM receiver 14 receives an FM multiple broadcasting wave through an FM antenna 14A, obtains VICS (Vehicle Information and Communication System) as road traffic information superposed on the FM multiple broadcasting wave, executes predetermined processing on the VICS information and then outputs the processed VICS information to the controller 20. Through a beacon antenna 15A (or a light receiving unit for receiving an optical beacon), the beacon receiver 15 receives beacon information as necessary road traffic information through an electronic wave (or light such as infrared light or the like) from a beacon placed on a road or the like in the neighborhood of a setup place of the beacon, subjects predetermined processing on the beacon information and outputting the processed beacon information to the controller 20. The FM receiver 14 and the beacon receiver 15 obtains alarm information together with traffic jam information such as required time information to a predetermined destination, accident information, disabled vehicle information, construction regulation information, chain regulation information, required time information between interchanges, road branch information, lane control information, service area information and parking information as the VICS information and the beacon information.

A liquid crystal display device having a touch panel is applied as the display unit 16, for example, and various kinds of information such as map information representing a searched guide route or facilities, etc. are displayed on the display unit 16 under the control of the controller 20.

The instruction input unit 17 comprises various kinds of operators including a joystick input device described later which are provided to the car navigation device 10, a receiver for receiving a transmission signal from a remote controller (not shown), etc., and outputs various kinds of instructions from a user to the controller 20.

The user interface unit 18 is constructed as an I/O control circuit, a driver or the like, and it is provided on the assumption of an interface function for connecting the display unit 16 and the instruction input unit 17 to the controller 20.

The alarm unit 19 is configured to have a speaker and an amplifier, and emits various kinds of sounds under the control of the controller 20. Accordingly, the alarm unit 19 functions as an alarming unit for alarming various kinds of information to a user.

The controller 20 controls the overall car navigation device 10, and it is constructed by CPU and peripheral circuits thereof. CPU reads out various kinds of data such as a control program, etc. stored in ROM 30, and executes control processing of the respective parts of the navigation device 10 in accordance with a user's instruction input through the instruction input unit 17. DRAM 31 is a memory used for a work area of CPU, and SRAM 32 is a non-volatile memory and is backed up with a battery or the like to hold a memory content even when a main power source of the car navigation device such as an accessory power source of a vehicle or the like are turned off. VRAM 33 is a memory for storing display data of the display unit 16.

The information storage unit 21 is a storage unit for storing map data, and specifically a hard disk device or a disk reading device which can read out the above data stored in a disk-shaped recording medium such as CD-ROM, DVD-ROM or the like may be applied as the information storing unit 21.

Furthermore, under the control of the controller 20, the external recording device controller 22 records/reads out data into/from an external recording medium connected to the car navigation device 10. A semiconductor storage device such as a memory card or the like is applied as the external recording medium.

Under the control of the controller 20, the communication controller 23 accesses an information center or the internet through wireless communication equipment (for example, a cellular phone, a wide area wireless LAN communication device or the like) 40, and receives various kinds of information through a wireless communication network.

Figure 2:
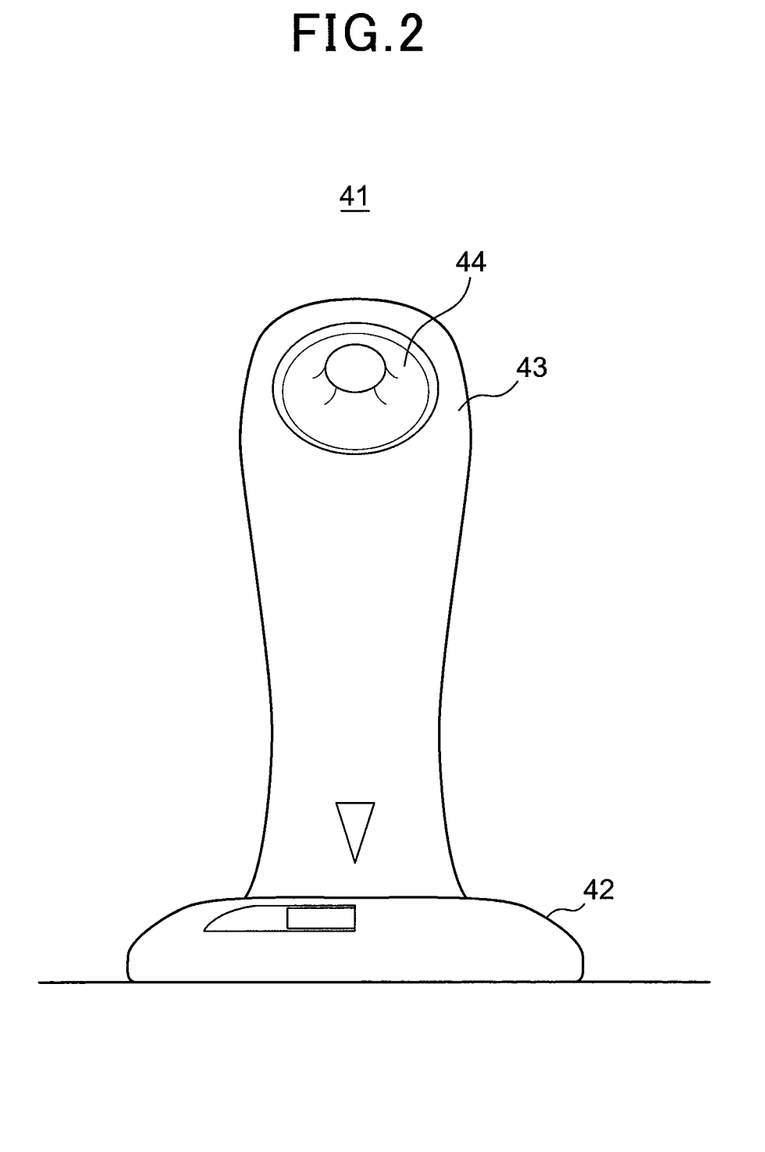
FIG. 2 is a front view of the outlook of a joystick input device constituting an instruction input unit.

FIG. 2 is a front view showing the outlook of the joystick input device constituting the instruction input unit.

Figure 3:
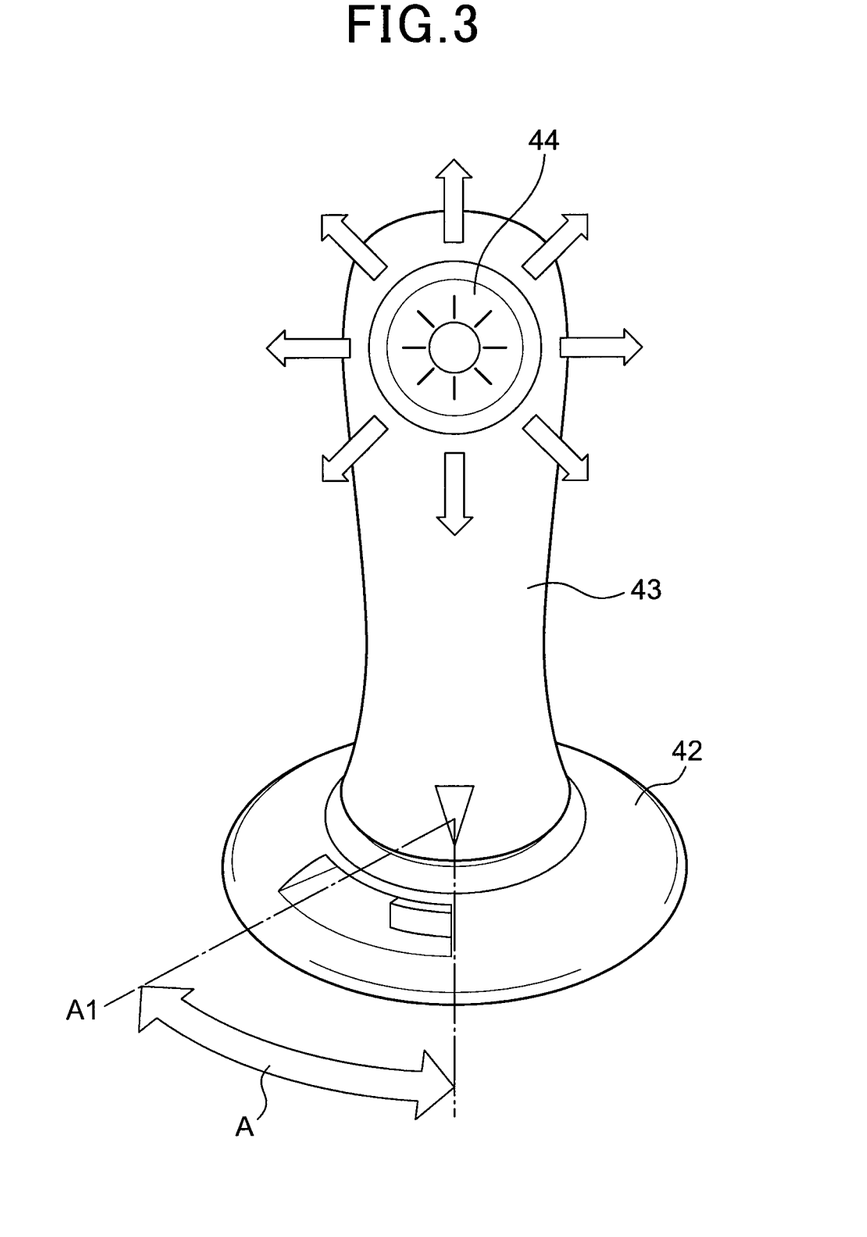
FIG. 3 is a diagram an operation (part 1) of the joystick input device.

FIG. 3 is a diagram (part 1) showing the operation of the joystick input device.

Figure 4:
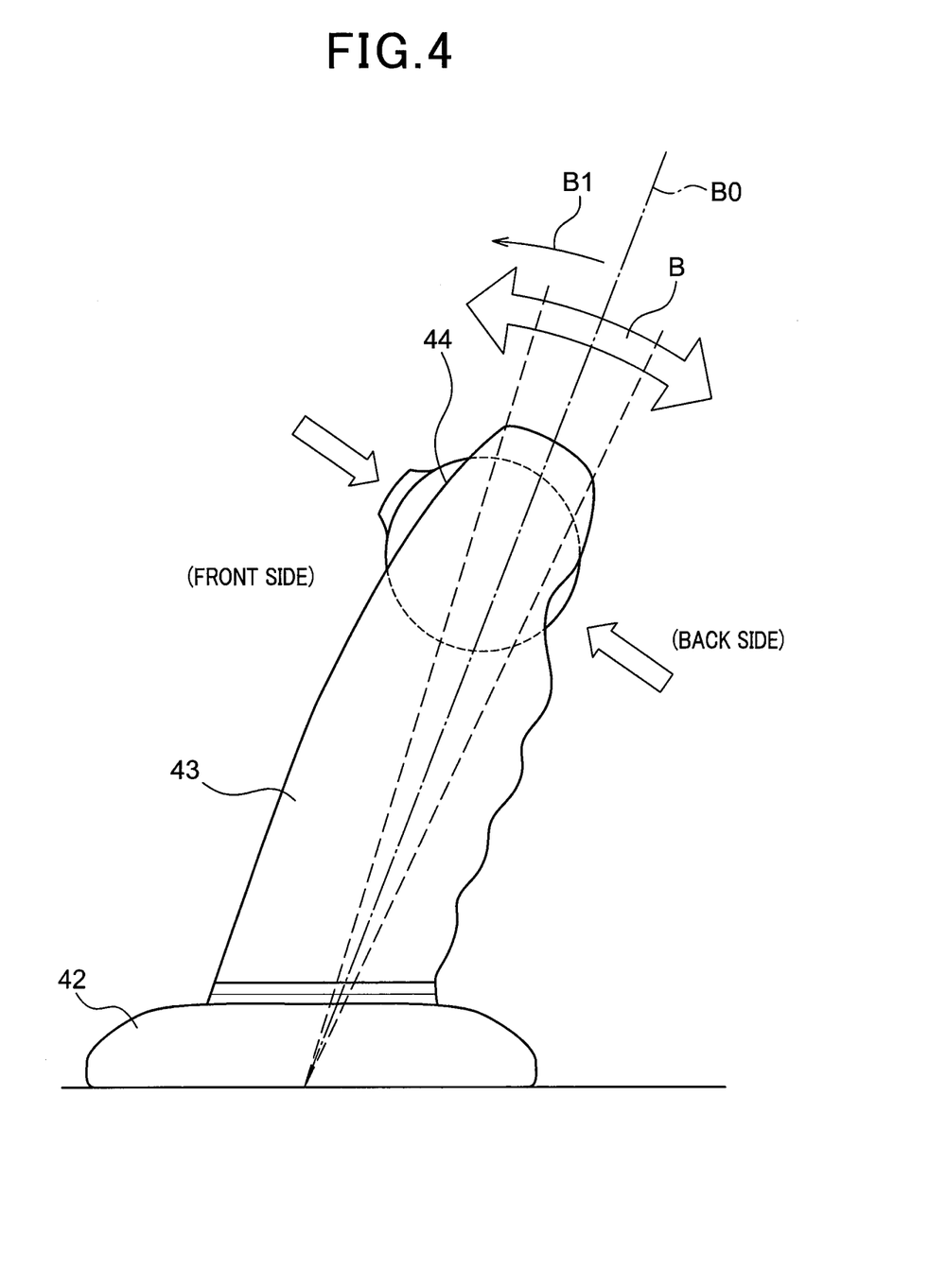
FIG. 4 is a diagram showing an operation (part 2) of the joystick input device.

FIG. 4 is a diagram (part 2) showing the operation of the joystick input device.

The joystick input device 41 roughly has a disk-shaped base portion 42, a stick-shaped arm portion 43 supported on the base portion 42, and a direction/zoom instruction input portion 44 provided to the arm portion 43.

The arm portion 43 is turnable within a range indicated by an arrow A as shown in FIG. 3 under the state that it is supported on the base portion 42. The arm portion 43 can be tilted in a direction indicated by an arrow B with a position B0 set as a reference position to control the vertical angle as shown in FIG. 4 under the state that it is supported on the base portion 42.

The direction/zoom instruction input portion 44 is turned (or tilted) in eight directions as shown in FIG. 3 when the device is actually used, whereby an operation of selecting a list item or scrolling a map can be performed. Furthermore, as shown in FIG. 4, the user can settle a selected list item or zoom in the display by pushing the direction/zoom instruction input unit 44 from the front side (from the upper left side in FIG. 4) to the back side (to the lower right side in FIG. 4). Furthermore, as shown in FIG. 4, the user can release the selected list item or zoom out the display by pushing the direction/zoom instruction input unit 44 from the back side (from the lower right side in FIG. 4) to the front side (from the upper left side in FIG. 4).

These operation states are taken into the controller 20 as digital data through the user interface unit 18, and converted to three-dimensional coordinate position data, overhead-view direction data and zoom data described later.

In this case, field angle data representing the angle of field and display magnification data representing the magnification of the display are used as the zoom data of this embodiment. However, any other data may be used insofar as the data interlocks with the zoom magnification.

Figure 5:
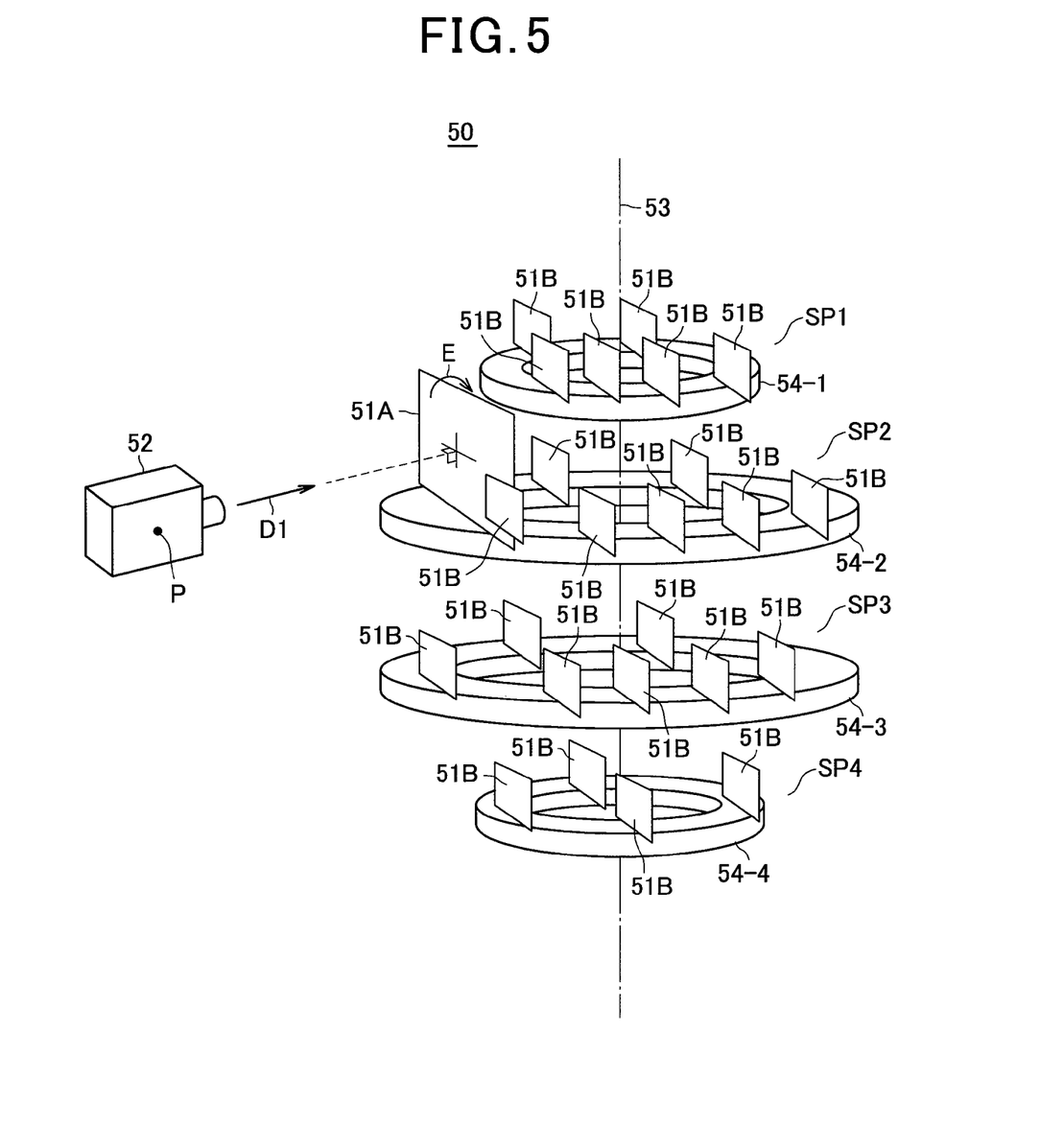
FIG. 5 is a conceptual diagram showing display control of the embodiment.

FIG. 5 is a diagram showing the concept of the display control of this embodiment.

In this embodiment, plural planar display objects 51 having predetermined display faces on which various kinds of information are displayed (=a main display object 51A and sub display objects 51B) are arranged in a virtual three-dimensional space 50, and on the basis of three-dimensional coordinate position data corresponding to a view-point position P input through the joystick input device 41, overhead-view direction data corresponding to an overhead-view direction D1 from the view-point P, display field angle data corresponding to a display field angle as zoom data and display magnification data corresponding to a display magnification, an image in which the display objects are overhead-viewed from the view-point position displayed on the display screen of the display unit 16 as a display device. In FIG. 5, a video camera is disposed at the view-point position for make the understanding easy.

In this embodiment, the plural display objects 51 (=the main display object 51A and the sub display objects 51B) are classified into plural predetermined categories of an identification information category, a time variation information category, a search information category and a set information category, and belong to any category. Accordingly, a user can easily reach necessary information or an input screen to implement his/her desired function by merely memorizing a category to which a user's desired matter belongs. Therefore, usability is more rapidly enhanced as compared with the menu screen of the hierarchical structure based on characters.

Here, the identification information category is used to display information associated with individual users to specify individual users. In this embodiment, information for identifying a driver of a vehicle in which the car navigation device 10 is mounted is stored. Specifically, assuming that users belong to a family, a father information object as information concerning a father as a driver, a mother information object as information concerning a mother, a son information object as information concerning a son, etc. are stored.

When these objects are selected, a user getting in a vehicle may be automatically identified to automatically select the corresponding object by using a short-distance wireless communication function (for example, Bluetooth (registered trademark) communication function) contained in a cellular phone terminal of a driver or a passenger.

The time variation information category is a category for display information varying with time. In this embodiment, rouge guide information of the car navigation is stored. More specifically, as the sub display objects 51B for displaying the time-variation information are stored a cross-point information object containing information of cross-points, a right-and-left turn information object containing information on right and left turn positions, a recommended surrounding point object containing information on recommended spots on the periphery of the route, etc.

The search information category is a category for displaying information necessary for search. In this embodiment, information for searching a destination or searching a reproduced music or video source is stored. More specifically, as the sub display objects 51B for searching a destination are stored a telephone number search object for inputting a telephone number and searching the corresponding point, an address search object for inputting an address and searching the corresponding address, a facility appellation search object for inputting the appellations of facilities and searching spots at which the facilities exist, a genre search object for searching a genre to which a music or video source belongs or a genre to which a store or facilities belong, a registered list search object for searching a registered list of spot lists which have been arbitrarily registered by a user, a peripheral search object for searching facilities located around the present position or an indicated position or facilities, etc., a television/magazine object for searching TV programs or magazine names or the contents of TV program or the contents of magazines, a return-home setting object for setting a return-home route from the present position (outdoor place) to the home, a destination release object for releasing a destination under the route guidance, etc.

As the sub display objects 51B are stored an FM/AM search object for searching the broadcast contents, channels, etc. of FM/AM, a DVD/CD search object for searching DVD/CD in which desired music sources or video sources are recorded or displaying music sources or video sources contained in indicated DVD/CD, a TV search object for searching a TV program, a portable audio player search object for searching music sources stored in a portable audio player, etc.

Various kinds of setting information (initial setting information, etc. are stored in the setting information category. More specifically, a navigation setting object, an audio setting object, an audio recording setting object, a monitor setting object, a menu setting object, a data editing object, a user setting object, etc. are stored as the sub display objects 51B for setting various kinds of information.

In this case, a predetermined axis 53 is virtually disposed in the virtual three-dimensional space 50, and the virtual three-dimensional space 53 is divided into four space areas SP1 to SP4 in the extension direction of the axis 53. The display objects 51 are arranged on rings 54-1 to 54-4 (on the circumferences of circles vertical to the axis 53) around the axis 53 in the space areas allocated to the categories to which the display objects 51 themselves belong.

Figure 6:
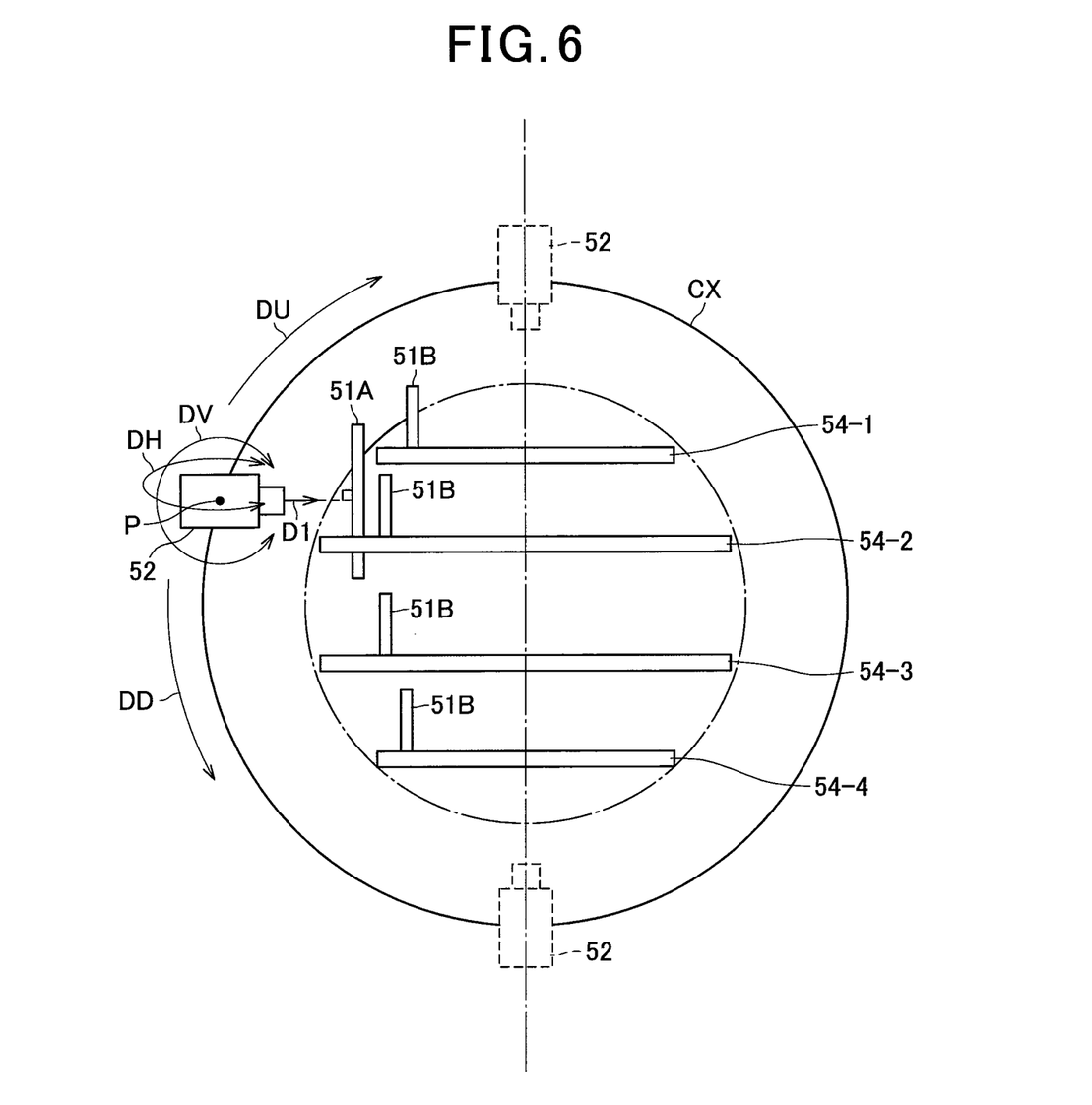
FIG. 6 is a diagram showing movement of a view point and change of an overhead-view (bird's-eye view).

FIG. 6 is a diagram showing the movement of the view point and the change of the overhead-view direction.

In connection with the operation of the joystick input device 41 described above, the position of the view-point position P and the overhead-view direction D1 can be changed.

Specifically, the user tilts the arm portion 43 of the joystick input device 41 in the direction of the arrow B with the position B0 as the reference position (the front and rear direction of the user when actually used), whereby the control 20 can display the view point position P on the display screen while the view point position P is changed along the circumference of a virtual circle CX.

Specifically, the user tilts the arm portion 43 of the joystick input device 41 in the direction of the arrow B1 with the position B0 as the reference position, whereby the controller 20 moves the video camera 52 in an upward direction DU along the circumference of the virtual circle CX and the front sides of the rings 54-1 to 54-4 are displayed on the display screen as if they are gradually rotated downwardly.

Finally, the controller 20 moves the virtual video camera 52, that is, the view point position P to a position as indicated by a broken line at the upper end of the virtual circle in FIG. 6, and the rings 54-1 to 54-4 are displayed on the display screen of the display unit 16 as if the user looks down at the rings from the upper side.

Furthermore, the user tilts the arm portion 43 of the joystick input device 41 in the opposite direction to the direction of the arrow B1 with the position B0 as the reference position, whereby the controller 20 moves the video camera 52 to a downward direction DD along the circumference of the virtual circle CX and the front sides of the rings 54-1 to 54-4 are displayed on the display screen of the display unit 16 as if they are gradually rotated upwardly.

Finally, the controller 20 moves the virtual video camera 52, that is, the view point position P to a position indicated by an broken line at the lower end of the virtual circle of FIG. 6, and thus the rings 54-1 to 54-4 are displayed on the display screen as the user looks up at the rings from the lower side.

Furthermore, the user turns the arm portion 43 of the joystick input device 41 with the range indicated by the arrow A, whereby the overhead-view direction D1 can be changed along the direction of the arrow DH. Accordingly, the controller 20 displays the display objects 51 so that the display objects 51 move to the right side or the left side on the display screen of the display unit 16.

Furthermore, the user operates the direction/zoom instruction input unit 44 upwardly or downwardly, whereby the overhead-view direction D1 can be changed in the direction of an arrow DV, and the controller 20 can the direction of the sight line of the user while the positions of the rings 54-1 to 54-4 are fixed.

Furthermore, the user fixes the arm portion 43 of the joystick input device 41 to a position indicated by a position A1 within a range indicated by an arrow A and tilts the arm portion 43 of the joystick input device 41 to the front side (in the direction of the arrow B1 of FIG. 4) with the position B0 set as the reference, whereby the controller 20 can display the main display object 51A on the display screen of the display unit 16 as if only the main display object 51A is tilted to the back side (in the direction of the arrow E in FIG. 5).

Figure 7:
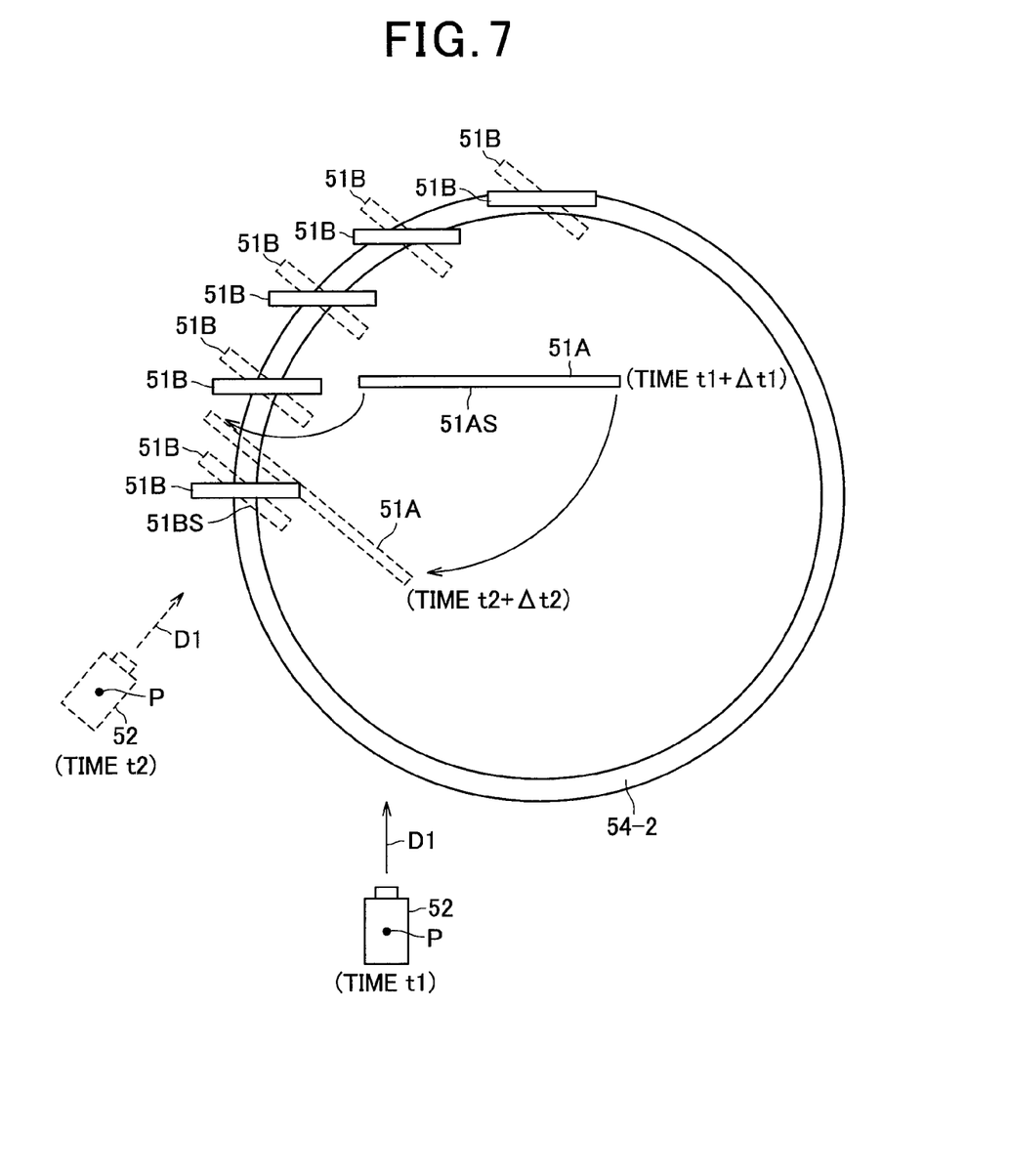
FIG. 7 is a diagram showing an operation when looking down at a ring from the upper side.

FIG. 7 is a diagram showing the operation when the user looks down at the rings in the axial direction.

In this case, it is assumed that the viewpoint position P is located at the position of the video camera 52 represented by a solid line in FIG. 7 under an initial state (time t1) and the overhead-view direction D1 from the view point position corresponds to the upward direction in FIG. 7. In this case, the main display object 51A and the sub display objects 51B as the display objects other than the main display object 51A, which constitute the display objects 51, are displayed on the display screen of the display unit 16 so that the display faces 51AS and 51BS of the respective display objects are oriented to be orthogonal to the overhead-view direction.

Figure 8:
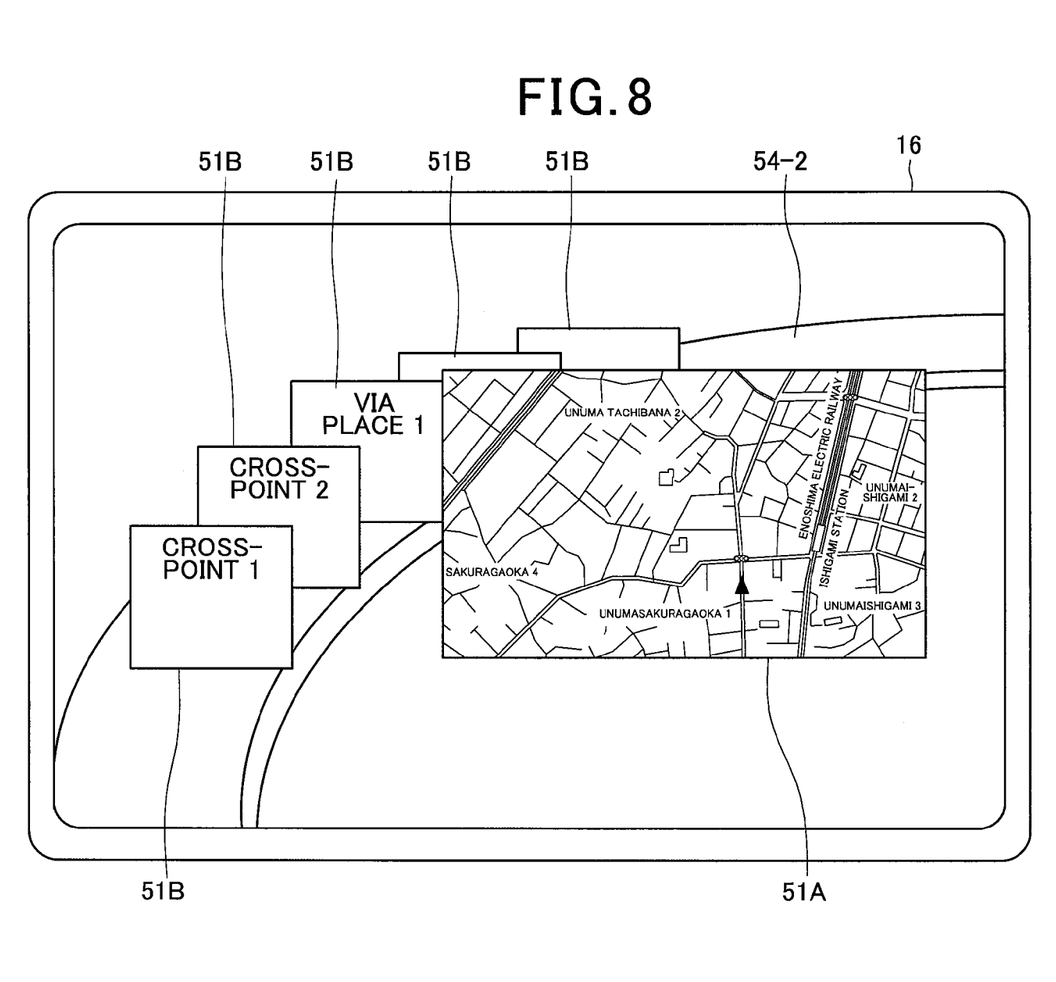
FIG. 8 is a diagram showing a display screen of an initial state.

FIG. 8 is a diagram showing the display screen of the initial state. When this state is displayed on the display screen by the display unit 16, the state as shown in FIG. 8 is displayed. A screen on which route detailed information as sub display objects (a cross-point 1, a cross-point 2 and a via place 1) is disposed on the ring 54-2 is displayed in the neighborhood of a navigation map screen as the main display object 51A.

When the user further operates the joystick input device 41 from the above state to move the viewpoint position P to the position of the vide camera 52 indicated by broken line in FIG. 7 and also set the overhead-view direction D1 to the upper right direction, the controller 20 turns the main display object 51A till a position indicated by a broken line so that the display face 51 of the main display object 51A is orthogonal to the overhead-view direction D1.

In this case, the turning start timing is set to a timing which is delayed from the turn start time t1 of the view point position P by only the time Δt1 so that the user can easily grasp that the main display object 51A is turned. The turning speed is gradually increased, and the turning is finished at a timing which is delayed from the turning end time t2 of the view point position P by only the time Δt2(<Δt1).

Figure 9:
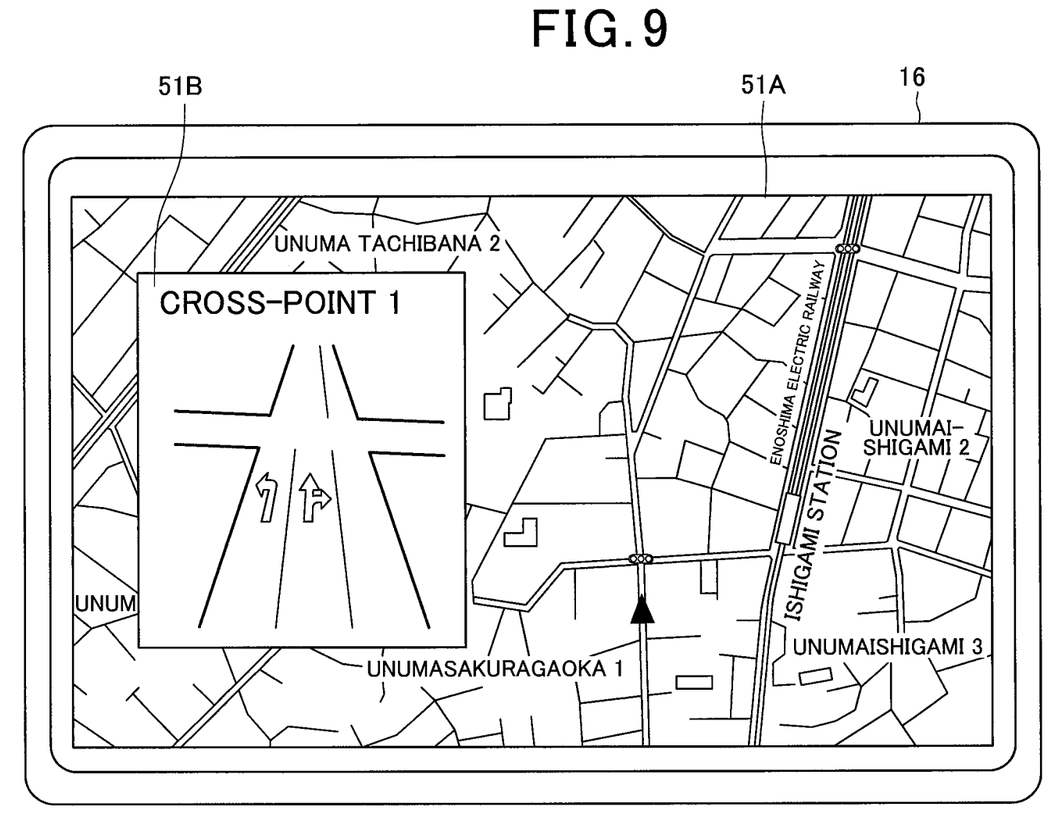
FIG. 9 is a diagram showing a display state after the visual point position is changed and zoom-in is executed, and also is a functional block diagram showing the construction of an operation support system of in-vehicle mount equipment.

FIG. 9 is a diagram showing the display state after the change of the view point position and zoom-in are performed.

When the view point position, the video camera 52 in FIG. 7 is moved to a position indicated by a broken line, the overhead-view direction D1 is set to a direction indicated by a broken line and the user pushes the direction/zoom instruction input unit 44 from the front side to the back side as shown in FIG. 4 to zoom in the display, the controller 20 displays the display screen of the display unit 16 so that the detailed diagram of the cross-point 1 as the sub display object 51B is fully viewed as popup on the surface of the navigation map screen as the main display object 51A as shown in FIG. 8.

as described above, according to this embodiment, the user can visually and instinctively grasp where the operation target (operation screen or input screen) corresponding to the function which the user wants to implement is disposed, and thus can easily perform the operation of the corresponding equipment.

In the foregoing description, the target device is the car navigation device. However, the present invention is not limited to the car navigation device, and may be applied to audio visual equipment, audio equipment and car navigation equipment. Furthermore, the present invention is not limited to in-vehicle mount equipment, but may be applied to display control of an information processing device having a small display screen.

In the foregoing description, the sub display objects are disposed in a horizontal ring-shaped arrangement. However, the present invention is not limited to this arrangement, and the sub display objects may be disposed in a vertical ring-shaped arrangement or a non-ring-shaped arrangement (for example, square arrangement).

In the foregoing description, the joystick input device 41 is used as the instruction input unit. However, an input device such as a key switch containing a keyboard, a mouse or the like may be likewise applied. Furthermore, the input device may be applied even when it is a wired type or wireless type.

The invention claimed is:

1. A display control apparatus comprising:
   a display device; and
   a controller configured to arrange flat type plural display objects each including a desired display face having desired information displayed thereon in a virtual three-dimensional space and to display on the display device an image in which the plural, display objects are viewed in an overhead-view direction from a variable view point position, based on three-dimensional coordinate position data corresponding to the variable view point position, overhead-view direction data corresponding to an overhead-view direction from the variable view point position and zoom data including display field angle and display magnification data corresponding to a display magnification, wherein:
   each of the plural display objects belongs to a category of plural predetermined categories and disposed in a predetermined area of each category;
   the display object objects comprise one main display object and sub display objects; and
   the controller is further configured to:
   rotate the display face of the main display object in accordance with variation of the variable view point position in the virtual three-dimensional space so that the display face of the main display object is disposed to be perpendicular to or intersects with the overhead-view direction and moved in the virtual three-dimensional space so as to be located in the overhead-view direction or in the neighborhood of the overhead-view direction and displayed on a display screen of the display device; and
   rotate the display faces of the sub display objects in accordance with the variation of the variable view point position in the virtual three-dimensional space so that the display faces of the sub display objects are disposed to be perpendicular to or intersect with the overhead-view direction and displayed on the display screen of the display device.

2. The display control apparatus according to claim 1, wherein a predetermined axis is virtually disposed in the virtual three-dimensional space, and the virtual three-dimensional space is divided into plural space areas in an extension direction of the predetermined axis.

3. The display control apparatus according to claim 2, wherein the plural display objects are disposed circumferentially with respect to a circle, vertical to the predetermined axis, around the predetermined axis in a space area allocated to a category for the plural display objects.

4. The display control apparatus according to claim 3, wherein a ring-shaped category identification object along the circumference of the circle is displayed in the neighborhood of the corresponding display object of every category.

5. The display control apparatus according to claim 1, wherein when the main display object is displayed on the entire display screen based on the three-dimensional coordinate position data and zoom data and a sub display object is located in front of the main display object, the sub display object is displayed as being superposed on the main display object as an overhead-viewed image.

6. The display control apparatus according to claim 1, wherein the predetermined categories contain an identification information category for displaying information to specify individual users, a time variation information category for displaying information varying with time, a search information category for displaying information necessary for search, and a setting information category for displaying various kinds of setting information.

7. The display control apparatus according to claim 6, wherein the display device is a display device used for an in-vehicle information processing device, and a display object belonging to the identification information category displays information necessary to specify a driver of a vehicle in which the in-vehicle information processing device is mounted.

8. The display control apparatus according to claim 6, wherein the display device is a display device used for an in-vehicle information processing device, and a display object belonging to the search information category displays information necessary to perform route guidance or searching a source for a reproduction target in a vehicle in which the in-vehicle navigation device is mounted.

9. The display control apparatus according to claim 6, wherein the display device is a display device used for an in-vehicle navigation device as an in-vehicle information processing device of a vehicle, and a display object belonging to the time variation information category displays information necessary to perform route guidance during operation of the vehicle.

10. The display control apparatus according to claim 9, wherein the main display object is a map screen for the route guidance.

11. The display control apparatus according to claim 1, further comprising an input device that provides the three-dimensional coordinate position data, the display field angle data and the display magnification data obtained from operation of the input device by a user.

12. A display control method for arranging flat type plural display objects each including a desired display face having information displayed thereon in a virtual three-dimensional space, and displaying on a display device display an image in which the display objects are viewed in an overhead-view direction from a variable view point position, based on three-dimensional coordinate position data corresponding to the variable view point position, overhead-view direction data corresponding to an overhead-view direction from the variable view point position and zoom data including display field angle data corresponding to a display field angle and display magnification data corresponding to a display magnification, the plural display objects belonging to a category of plural predetermined categories and being arranged in predetermined areas and classified into one main display object and sub display objects other than the one main display object, the display control method comprising steps of:
   rotating the display face of the main display object in accordance with variation of the variable view point position in the virtual three-dimensional space so that the display face of the main display object is disposed to be perpendicular to or intersect with the overhead-view direction and moved in the virtual three-dimensional space so as to be located in the overhead-view direction or in the neighborhood of the overhead-view direction;
   rotating the display faces of the sub display objects in accordance with the variation of the view point position in the virtual three-dimensional space so that display faces of the sub display objects are disposed to be perpendicular to or intersect with the overhead-view direction; and
   displaying an overhead-viewed image of the main display object and sub display objects on a display screen of the display device.

13. An article of manufacture comprising a machine-readable non-transitory storage medium and a control program for causing a processor of a computer to execute a control process on a display control device for arranging flat type plural display objects each having a desired display face and having information displayed thereon in a virtual three-dimensional space, and displaying on a display device an image in which the plural display objects are viewed in an overhead-view direction from a variable view point position, based on three-dimensional coordinate position data corresponding to the view point position, overhead-view direction data corresponding to an overhead-view direction from the view point position and zoom data including display field angle data corresponding to a display field angle and display magnification data corresponding to a display magnification, the plural display objects belonging to a category of plural predetermined categories and being arranged in predetermined areas and classified into one main display object and sub display objects other than the one main display object, the control program being embodied on the machine-readable, non-transitory storage medium and including instructions that, when executed, cause the processor of the computer to:

rotate a display face of the one main display object in accordance with variation of the variable view point position in the virtual three-dimensional space so that the display face of the main display object is disposed to be perpendicular to or intersects with the overhead-view direction and moved in the virtual three-dimensional space so as to be located in the overhead-view direction or in the neighborhood of the overhead-view direction;

rotate the display faces of the sub display objects in accordance with the variation of the variable view point position in the virtual three-dimensional space so that the display faces of the sub display objects are disposed to be perpendicular to or intersect with the overhead view direction; and display an overhead-viewed image of the main display object and sub display objects on a display screen of the display device.

14. A display control apparatus comprising:
a display device;
a storage unit configured to store different kinds of category data each including various display information belonging thereto; and
a controller configured to:
arrange a plurality of category space areas in association with the different kinds of category data along a predetermined axis in a virtual three-dimensional space so that each of the different kinds of category data is associated with each of the category space areas,
arrange flat type plural display objects each having a display face having display information displayed thereon in the virtual three-dimensional spate such that a display object having display information belonging to a kind of category data is arranged on a category space area associated with the kind of category data, and
display on the display device an image in which the display objects arranged on the category space areas are viewed in an overhead-view direction from a variable viewpoint position, wherein:
the plurality of display objects comprises one main display object and sub display objects; and
the controller is further configured to:
rotate the display face of the main display object in accordance with variation of the view point position in the virtual three-dimensional space so that the display face of the main display object is perpendicular to or intersect with the overhead-view direction in the virtual three-dimensional space and located substantially in the overhead-view direction and display the rotated display face of the main display object on a display screen of the display device; and
rotate display faces of the sub display objects in accordance with the variation of the view point position in the virtual three-dimensional space so that the display faces of the sub display objects are disposed to be perpendicular to or intersect with the overhead-view direction and display the rotated display faces of the sub display objects on the display screen of the display device.

15. The display control apparatus according to claim 14, wherein the plural display objects are arranged based on three-dimensional coordinate position data corresponding to the view point position, overhead-view direction data corresponding to an overhead-view direction from the view point position, and zoom data including display field angle data corresponding to a display field angle and display magnification data corresponding to a display magnification.

16. A display control apparatus comprising:
a display device;
a storage unit configured to store different kinds of category data each of which contains various display information belonging thereto; and
a controller configured to arrange flat type plural display objects each having a display face having desired information displayed thereon in a virtual three-dimensional space and to display on the display device an image in which the plural display objects are viewed in an overhead-view direction from a variable viewpoint position, wherein:
each of the plural display objects belongs to a category of plural predetermined categories;
the plural display objects comprise one main display object and sub display objects; and
the controller is further configured to:
rotate a display face of the main display object in accordance with variation of the view point position in the virtual three-dimensional space so that the display face of the main display object is disposed to be perpendicular to or intersect with the overhead-view direction and located substantially in the overhead-view direction and display the rotated display face of the main display object on a display screen of the display device; and
rotate display faces of the sub display objects in accordance with the variation of the view point position in the virtual three-dimensional space so that the display faces of the sub display objects are disposed to be perpendicular to or intersect with the overhead-view direction and display the rotated display faces of the sub display objects on the display screen of the display device.

17. The display control apparatus according to claim 16, wherein the plural display objects are arranged based on three-dimensional coordinate position data corresponding to the view point position, overhead-view direction data corresponding to an overhead-view direction from the view point position, and zoom data including display field angle data corresponding to a display field angle and display magnification data corresponding to a display magnification.

* * * * *